United States Patent Office 3,433,316
Patented Mar. 18, 1969

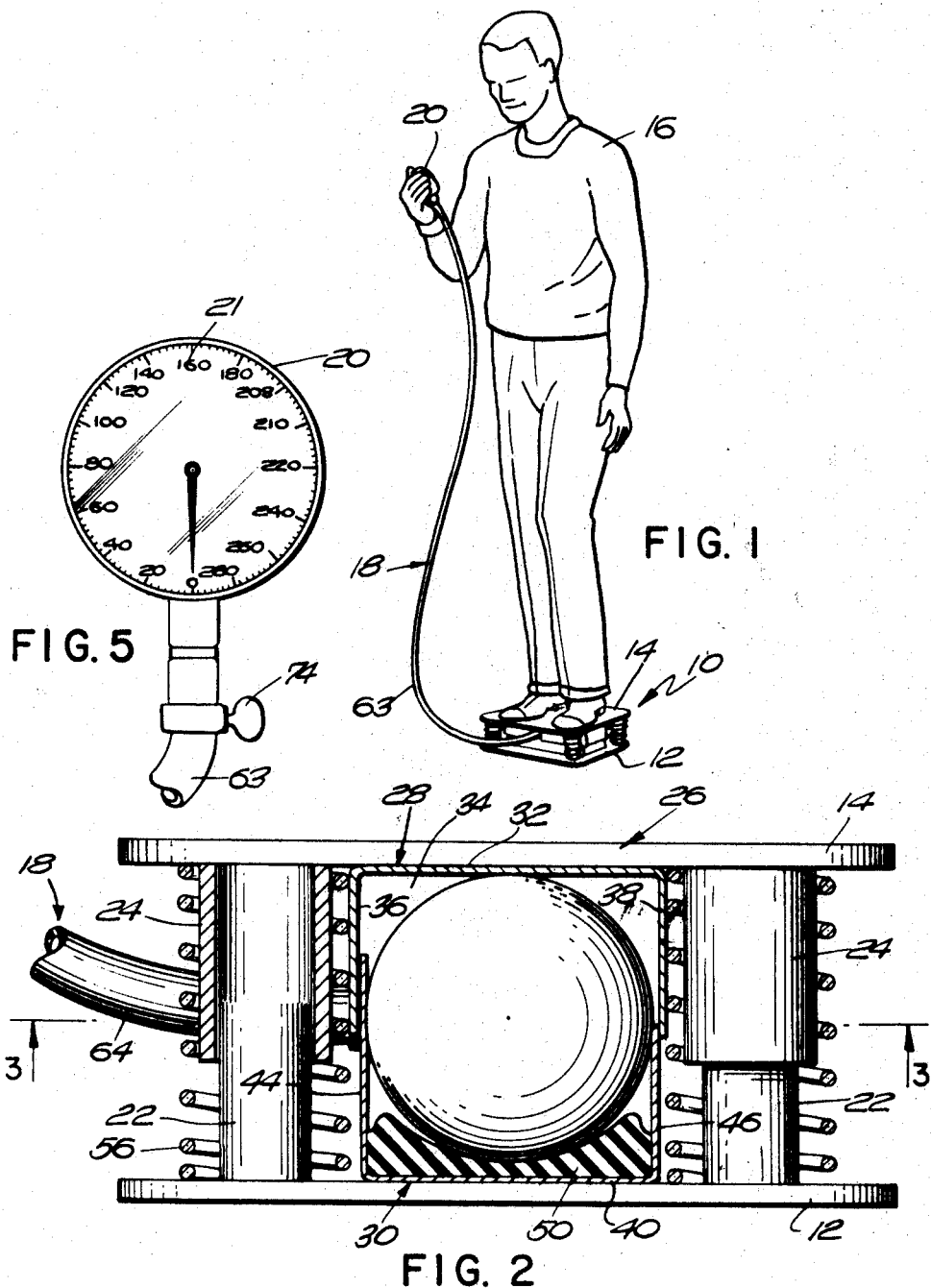

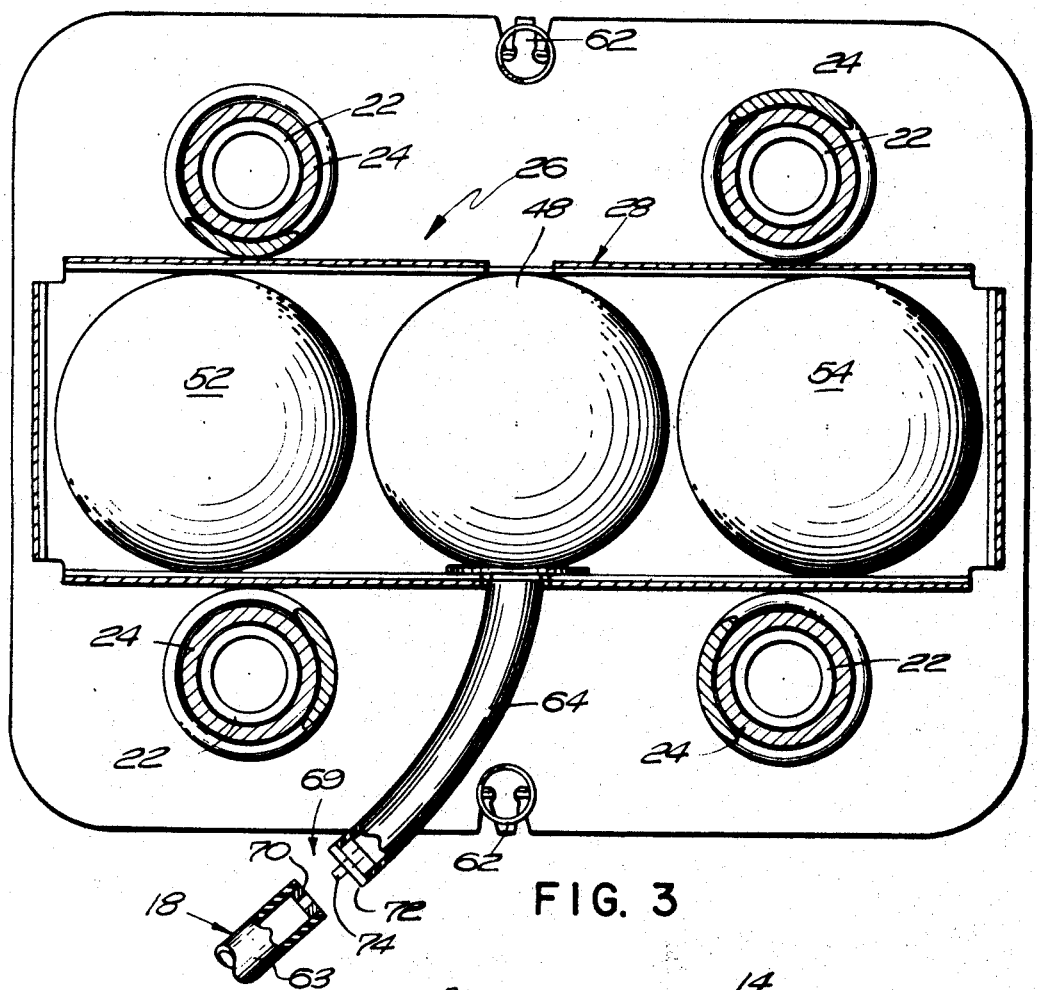
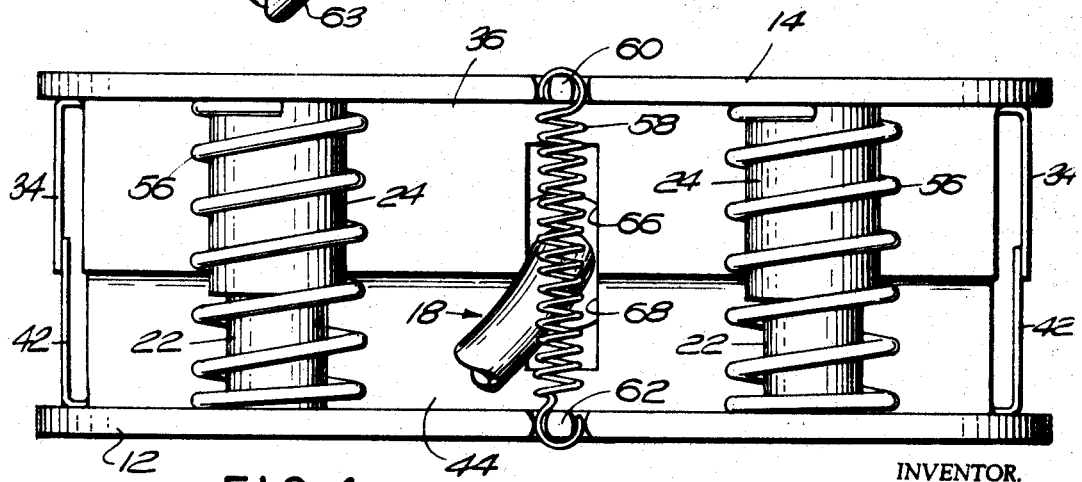

3,433,316
WEIGHING DEVICE
Samuel Newman, Riverdale, N.Y., assignor to
Barney Newman, Brookline, Mass.
Filed Nov. 13, 1967, Ser. No. 682,127
U.S. Cl. 177—208    8 Claims
Int. Cl. G01g 5/04

ABSTRACT OF THE DISCLOSURE

A weighing device having a base and platform and between which an air cell is located, the air cell communicating through a flexible tube with an indicator that is movable to a variety of positions, and the air cell being further responsive to a load that is imposed on the platform for producing a corresponding indication on the indicator.

Background of the invention

The present invention has particular application as a weighing scale of the type that is normally located in a bathroom or the like. Bathroom scales known heretofore have generally consisted of a spring-type unit that included a weighing platform that was responsive to the weight of the person standing thereon to cause a reading to be registered on a scale that was formed as an intergral part of the unit. Although these prior known scales have served the purpose for which they were intended, they were known to be unreliable after a period of use and although they were portable, they were not easily packaged for carrying from one location to another. Another problem that has been experienced in the heretofore known weighing scale was the inability of the person using the scale to properly read the indicator. Many people who used such scales when it was located in the bathroom required glasses and were oftentimes inconvenienced since they may not have been wearing their glasses when they stepped on the scale to obtain a weight reading and thus could not obtain an accurate reading. Furthermore, the scales of the heretofore known weighing devices were not too readily discernible by the person standing on the scale because of the poorly constructed dials or the fact that the dial may have become obscured because of wear or dust.

Summary of the invention

The present invention is directed to a weighing device that includes a base from which a weighing platform is spaced in vertical relation with respect thereto. An air cell is located between the base and platform and in the specific form of the invention is disposed in a housing, the upper section of which engages the platform and is located in contact with the air cell. The housing also includes a lower section, the upper and lower sections of the housing having relative movement so that when a load is imposed on the platform the upper section is movable with respect to the lower section to deflect the air cell. Communicating with the air cell is a flexible tube that is somewhat elongated and on the end of which is mounted a calibrated indicator. The indicator is movable to any desired position, being limited only by the length of the elongated flexible tubing, and may be held in the hand of the person that is standing on the weighing platform. The air cell, flexible tube and indicator define a closed pneumatic circuit, the indicator mechanism being responsive to an increase in pressure of the air in the closed circuit when the air cell is deflected. Thus, no special fluid medium is contained in the closed circuit, and the mere deflection of the air cell will cause a reading to be observed on the calibrated indicator when a load is applied to the platform.

Accordingly, it is an object of the invention to provide a weighing device that incorporates an air cell therein for producing a reading on an indicator that communicates therewith, the reading corresponding to the deflection of the air cell as the result of a weight imposed thereon.

Another object of the invention is to provide a weighing device having an air cell that is responsive to a load applied to the device and that has a flexible tube communicating therewith, a calibrated indicator being affixed to the end of the flexible tube and being movable to a position that is convenient to the user of the device.

Still another object is to provide a weighing device that incorporates an air cell therein and that is located in a housing that is disposed between a base and a platform, the platform being movable in vertical relation and being guided in the vertical movement by orienting elements that are secured to the base and platform.

Still another object is to provide an air cell for use in a weighing device to which a flexible tube and calibrated scale are interconnected, the air cell, flexible tube and calibrated scale defining a closed pneumatic circuit that is free of a pressure medium and that is responsive to deflection of the air cell for producing a corresponding reading on the indicator.

Other objects, features and advantages of the invention will become apparent as the description thereof proceeds when considered in connection with the accompanying drawings.

Description of the drawing

In the drawings which illustrate the best mode presently contemplated for carrying out the present invention:

FIG. 1 is a perspective view of the weighing device embodied in the present invention and showing a person mounted thereon in the position of use;

FIG. 2 is a side elevational view with parts shown in section of the weighing device embodied in the present invention;

FIG. 3 is a sectional view taken along lines 3—3 in FIG. 2;

FIG. 4 is a front elevational view of the weighing device; and

FIG. 5 is a plan view of the calibrated scale as it is connected to the flexible tube that is interconnected to the air cell located in the weighing device.

Description of the invention

Referring now to the drawings and particularly to FIG. 1, the weighing device embodied in the present invention is generally indicated at 10 and, as shown, includes a base 12 over which a platform 14 is located in spaced vertical relation. The platform 14 is adapted to receive a load thereon, such as represented by the figure 16 and as will be described hereinafter, an air cell is interposed between the base 12 and platform 14 and is adapted to be deflected when a load is applied to the platform 14. A flexible tube 18 is interconnected to the air cell and mounted on the outermost end of the flexible tube is an indicator 20 having a scale 21, the indicator 20 being movable to any convenient position, as illustrated in FIG. 1 wherein it may be held in the hand of the user for ready viewing. The scale 21 of the indicator 20 is normally calibrated to indicate weight in pounds, but it is understood that the indicator may be calibrated in any convenient scale depending upon the use thereof. It is understood that the weighing device 10 has particular application as a weighing scale for household use, and in this connection, it will be particularly useful in the bathroom or bedroom; however, the concept of the invention is not limited to weighing people, and it is understood that any load may be placed on the platform 14, the result of which is reflected on the scale of the indicator 20.

Referring now to FIGS. 2, 3 and 4, the weighing device is illustrated in detail, and, as shown therein, the platform 14 is disposed in spaced vertical relation with respect to the base 12 and is adaptable for vertical movement with respect thereto in oriented relation. The vertical orienting of the platform 14 as it moves with respect to the base 12 is accomplished by locating a plurality of posts 22 in upstanding position on the base 12. Fixed to the platform 14 on the underside thereof and located in aligned position with respect to the posts 22 are a plurality of tubes 24. The tubes 24 are dimensioned such that they telescopingly receive the posts 22 therein, and thus the platform 14 is guided as it is moved relative to the base 12.

Located between the base 12 and platform 14 is a housing generally indicated at 26, the longitudinal dimension of which is slightly less than the longitudinal dimension of the platform and base and having a width that provides for placement thereof between the posts and tubes 22, 24, as illustrated in FIG. 3. The housing 26 includes an upper section 28 having a top wall 32, with which the platform 14 engages side walls 34, a front wall 36, and a rear wall 38. The housing also includes a bottom section 30 that has a configuration corresponding to that of the top section 28 but is somewhat reduced in the dimensions thereof so that it telescopes within the top section 28. As seen in FIGS. 2, 3 and 4, the bottom section 30 includes a bottom wall 40, side walls 42, a front wall 44, and a rear wall 46. The side walls 42 of the bottom section 30 are received within the side walls 34 of the top section, and the corresponding front and rear walls 44 and 46 of the bottom section are received between the front and rear walls 36, 38 of the top section. With the top and bottom sections 28 and 30 located as indicated, it is seen that the top section 28 is movable by the platform 14 and relative to the bottom section 30 as the platform 14 is moved downwardly by a weight applied thereto.

Located within the housing 26 is a spherical air cell 48, the diameter of the air cell 48 being such that when it is located in the position of use, the wall 32 of the upper housing section 28 is disposed in engaging relation therewith. The air cell 48 is held in relatively fixed position by locating it in a concave depression of a base element 50 that is disposed on the bottom wall 40 of the bottom section 30. The air cell 48 is thus retained in a relatively fixed position with respect to the top and bottom sections 28, 30. In order to balance the top section 28 of the housing 26, additional air cells 52 and 54 are provided and occupy the spaces adjacent to the air cell 48. However, as will hereinafter be described, the air cells 52 and 54 as employed in the present invention serve only to provide a balancing action and are not operable in reflecting the weight as imposed on the platform 14. It is understood that base elements corresponding to the base element 50 are located on the bottom wall 40 of the bottom section 30 for receiving the air cells 52 and 54 therein. It is also contemplated that the air cell 48 be formed in a configuration that would occupy the entire housing and in this instance would replace the air cells 52 and 54.

In order to bias the platform 14 with respect to the base 12 so that a weight imposed on the platform 14 will not unduly deflect the air cell 48, spring elements 56 are provided and, as shown in FIGS. 2, 3 and 4, are located in encircling relation around the telescoping posts 22 and tubes 24. It is seen that when a weight is imposed on the platform 14 the springs 56 will inherently resist deflection of the platform 14 but are calibrated to permit the platform 14 to move downwardly in accordance with the weight thereon to deform the air cell 48. The assembly is secured together by fastening springs 58, the ends of which are coupled to cutout projections 60 and 62 as formed in the platform 14 and base 12, respectively. It is seen that the fastening springs 58 will lock the base 12 and the platform 14 together but will permit relative movement therebetween when a load is imposed on the platform 14.

As previously mentioned, the air cell as represented by the spherical member 48 communicates with the indicator 20 through a flexible tube 18 to define a closed circuit therewith. As illustrated in FIGS. 3 and 4, the flexible tube 18 comprises an elongated portion 63 that is connectable to the indicator 20 and a shortened portion 64 that is sealingly connected to the air cell 48. The shortened portion 64 of the flexible tube extends into the air cell 48 for connection therein, access being provided through the front walls 36 and 44 of the top and bottom sections by appropriately formed slots 66 and 68. The shortened portion 64 of the flexible tube is interconnected to the elongated portion 63 through a coupling generally indicated at 69 which, as shown in FIG. 3, comprises an inner ring 70 with which a member 72 having a projecting element 74 secured thereto is coupled. The projecting element 74 is inserted through the opening in the ring 70 and is formed with an opening therethrough, thereby providing for communication of the air cell 48 through the flexible tube 18 with the indicator 20.

In order to close off communication of the circuit between the air cell 48 and the indicator 20, a shut-off valve 75 is provided and is located in the flexible tube 18 adjacent to the indicator 20. Since the valve 75 is located adjacent to the indicator 20 that is normally held in the hand of the user standing on the platform 14, the user may properly position himself on the plaftorm before releasing the valve 75 wherein an accurate reading may be obtained. Although the specific details of the valve 75 are not illustrated, it is understood that this valve may be constructed in any convenient manner and will be operated to pinch the flexible tubing 18 to seal the opening therein and will thereby prevent the deflection of the air cell 48 from operating the indicator 20.

In use of the weighing device, it is easily assembled in the manner as indicated, and, if required, the assembly, including the base 12, platform 14 and housing 26 as secured together by the fastening springs 58, may be transported as a unit or in a container from one location to another. In this connection, the elongated portion 63 of the flexible tube 18 may be disconnected from the shortened portion 64 by removing the member 72 from the ring 70. The elongated portion 63 of the flexible tube and indicator 20 are then free for packaging or carrying independently of the basic unit. When the weighing device is assembled for use, the person or load to be weighted rests on the platform 14 thereby causing a deformation or deflection of the air cell 48. With the valve 75 located in open position, a closed circuit is created between the air cell 48 and the indicator 20. When the air cell 48 is deformed, the air contained in the closed circuit is compressed which is reflected by a corresponding reading appearing on the indicator 20.

What is claimed is:

1. In a weighing device, a horizontal base, a horizontal platform spaced above said base in substantially parallel disposition with respect thereto, means mounting said platform for movement toward and away from said base, said means maintaining said platform and base in substantially parallel relation during said movement, an air cell positioned between said base and platform substantially bridging the space therebetween and being deformable upon downward movement of said platform to reflect the amount of load applied to said platform, the under surface of said platform being closely adjacent to the top of said air cell when there is no load on said platform, a flexible tube communicating with said air cell, and an indicator communicating with said flexible tube and being responsive to the deformation of said air cell for indicating the load applied to said platform, said mounting means comprising a peripheral wall defining an enclosure depending from the under surface of said platform, and a similarly configured peripheral wall extending upwardly from said base and constrainingly receiving said air cell therein, said walls being in telescoping relation with respect to each other and surrounding said air cell so as to form a housing therefor.

2. In the weighing device of claim 1, means located adjacent to said air cell in said housing for balancing the distribution of the load as imposed on said air cell when it is deformed.

3. In the weighing device of claim 1, resilient means positioned between said base and platform for absorbing some of the load applied to said platform.

4. In a weighing device as set forth in claim 1, said air cell being free of liquid fluids and defining a closed circuit with said flexible tube and indicator, wherein atmospheric air captured in said closed circuit is employed as a pressure medium for producing a response on said indicator when said air cell is deformed upon application of a load to said platform.

5. In a weighing device as set forth in claim 4, a control valve located on said flexible tube and being operative to close off communication between said air cell and said indicator.

6. In a weighing device as set forth in claim 4, a coupling located in said flexible tube in close proximity to said air cell and housing, thereby dividing said flexible tube into at least an elongated portion and a shortened portion, said elongated portion being removable from engagement with said shortened portion by disengagement of said coupling to provide for packaging or storing of said elongated tube and indicator.

7. In a weighing device, a base, a vertically movable platform located above said base in spaced vertical relation for accommodating a load thereon, means for orienting said platform with respect to said base so that movement of said platform is essentially vertical when a weight is imposed thereon, an air cell positioned between said base and platform and being deformable upon downward movement of said platform to reflect the amount of the load applied thereto, a flexible tube communicating with said air cell, and an indicator communicating with said flexible tube and being responsive to the deformation of said air cell for indicating the load applied to said platform, a housing located between said base and platform and including a bottom section in which said air cell is positioned, a top section mounted over said bottom section and movable with respect thereto and in response to the load applied to said platform for deforming said air cell, said orienting means including a plurality of posts secured to one of said sections and a plurality of tubes secured to the other of said sections, each of said tubes telescopingly receiving a post for movement therein whereby said upper section is movable vertically downwardly when a load is applied thereto, said housing being located between said posts and telescoping tubes so that the load applied on said platform is equally distributed on said upper section of said housing, and a spring encircling each of said posts and telescoping tubes and being disposed in an engaging relation with the inner surfaces of said platform and base, said springs being calibrated to permit movement of said platform when a sufficient load is applied thereto.

8. In a weighing device, a base, a vertically movable platform located above said base in spaced vertical relation for accommodating a load thereon, means for orienting said platform with respect to said base so that movement of said platform is essentially vertical when a weight is imposed thereon, an air cell positioned between said base and platform and being deformable upon downward movement of said platform to reflect the amount of the load applied thereto, a flexible tube communicating with said air cell, and an indicator communicating with said flexible tube and being responsive to the deformation of said air cell for indicating the load applied to said platform, a housing located between said base and platform and including a bottom section in which said air cell is positioned, a top section mounted over said bottom section and movable with respect thereto and in response to the load applied to said platform for deforming said air cell, said air cell being defined by a hollow deformable member located intermediate said housing, and additional hollow deformable members located adjacent to said air cell in said housing for balancing the distribution of the load as imposed on said air cell when it is deformed.

References Cited

UNITED STATES PATENTS

| 3,217,818 | 11/1965 | Engelsher et al. | 177—209 X |
| 3,305,036 | 2/1967 | Walters | 177—209 |
| 3,314,492 | 4/1967 | Felton et al. | 177—208 X |

FOREIGN PATENTS

| 10,485 | 5/1904 | Great Britain. |

RICHARD B. WILKINSON, *Primary Examiner.*

G. H. MILLER, JR., *Assistant Examiner.*